Sept. 29, 1970     J. B. BRIGGS     3,531,725

CO-CHANNEL REJECTION SYSTEM

Filed July 3, 1967     2 Sheets-Sheet 1

JAMES BRIGGS
INVENTOR

BY Lyon & Lyon

ATTORNEYS

United States Patent Office 3,531,725
Patented Sept. 29, 1970

3,531,725
CO-CHANNEL REJECTION SYSTEM
James B. Briggs, La Crescenta, Calif., assignor to Hoffman Electronics Corporation, El Monte, Calif., a corporation of California
Filed July 3, 1967, Ser. No. 650,910
Int. Cl. H03k 5/20
U.S. Cl. 328—117                                                11 Claims

ABSTRACT OF THE DISCLOSURE

A system for rejecting secondary signals received by an airborne Tacan equipment by providing a second having a higher level than the primary threshold circuit threshold circuit and which, when energized by a pulse of a detected reference group, sets a burst enable flip-flop which activates gating circuits and enables an output signal indicating that a group has been received to be passed to the remainder of the system.

BACKGROUND OF THE INVENTION

In Tacan systems there are a plurality of channels available for use by individual ground beacons. The ground beacons operating on the same channel are separated geographically as much as possible; however, it often occurs that an airborne unit picks up pulses from two different ground beacons operating on the same channel. Although one set of signals is commonly much stronge than the other, the receiving equipment is set to pass any pulses whose magnitude exceeds a threshold value, usually 50% of the maximum pulse height. In some cases, particularly when the primary and secondary signal trains are out of phase, some of the secondary pulses can have a magnitude which exceeds this threshold value. In such an event, these pulses are accepted as coming from the beason being tracked and consequently diminish system accuracy.

SUMMARY OF THE INVENTION

According to the present invention, a desired level of co-channel rejection is achieved by requiring that at least one pulse of a group exceed a threshold level which is considerably greater than the primary threshold level of the system. For example, if the primary threshold level that pulses must exceed in order to be passed is 50% of the maximum pulse height, the secondary threshold might be set at 90% of the maximum pulse height. The system thus requires that not only must the pulse pattern of a group match the expected pattern and the pulses exceed a predetermined threshold, it additionally requires that at least one pulse of the pattern exceed the secondary threshold. For the primary pulse group, this presents virtually no problem as at least one of these pulses is almost certain to exceed the higher threshold; however, for a secondary pulse group, even one 180° out of phase with the primary group, it is extremely unlikely that even one of the pulses will exceed the higher threshold. Consequently, interference by the secondary group and the resulting inaccuracies in computations caused thereby are virtually eliminated.

It is therefore an object of the present invention to provide a system in which only the stronger of two otherwise equally acceptable pulse groups are accepted.

DESCRIPTION OF THE INVENTION

Figure 1:
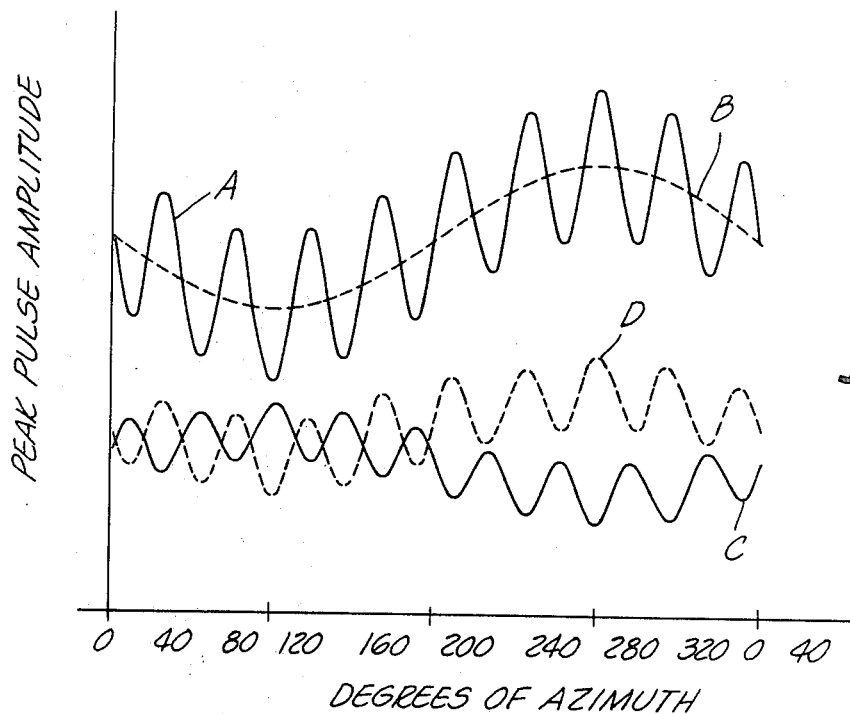
FIG. 1 is a curve showing the manner in which signal trains from two Tacon beacons operating on the same channel can interfere with each other.

In FIG. 1, there are shown two curves which represent the amplitude modulated signal trains received from two Tacon ground beacons operating on the same channel but being 180° out of phase.

Curve A represents the amplitude of the composite modulation, that is, both the 15 hertz and 135 hertz modulation while curve B represents the amplitude of the modulation of the 15 hertz component alone. Curve C represents the amplitude of the composite modulation of the secondary signal train. Curve D represents the threshold level set for the pulses making up the amplitude modulation envelope A and is arranged to fall at 50% of the value of envelope A.

The level of the threshold D is set by system requirements and establishes the level at which pulses will be passed to the remainder of the system. As can be seen, the magnitude of the modulation envelope C exceeds the curve D over a significant portion of this curve, particularly where as shown, the curves C and A are 180° out of phase, that is, the worse possible case. Consequently, if false reference bursts occur while the curve C is above the curve D, signals will be passed to the remainder of the system that will reduce its accuracy.

Figure 2:
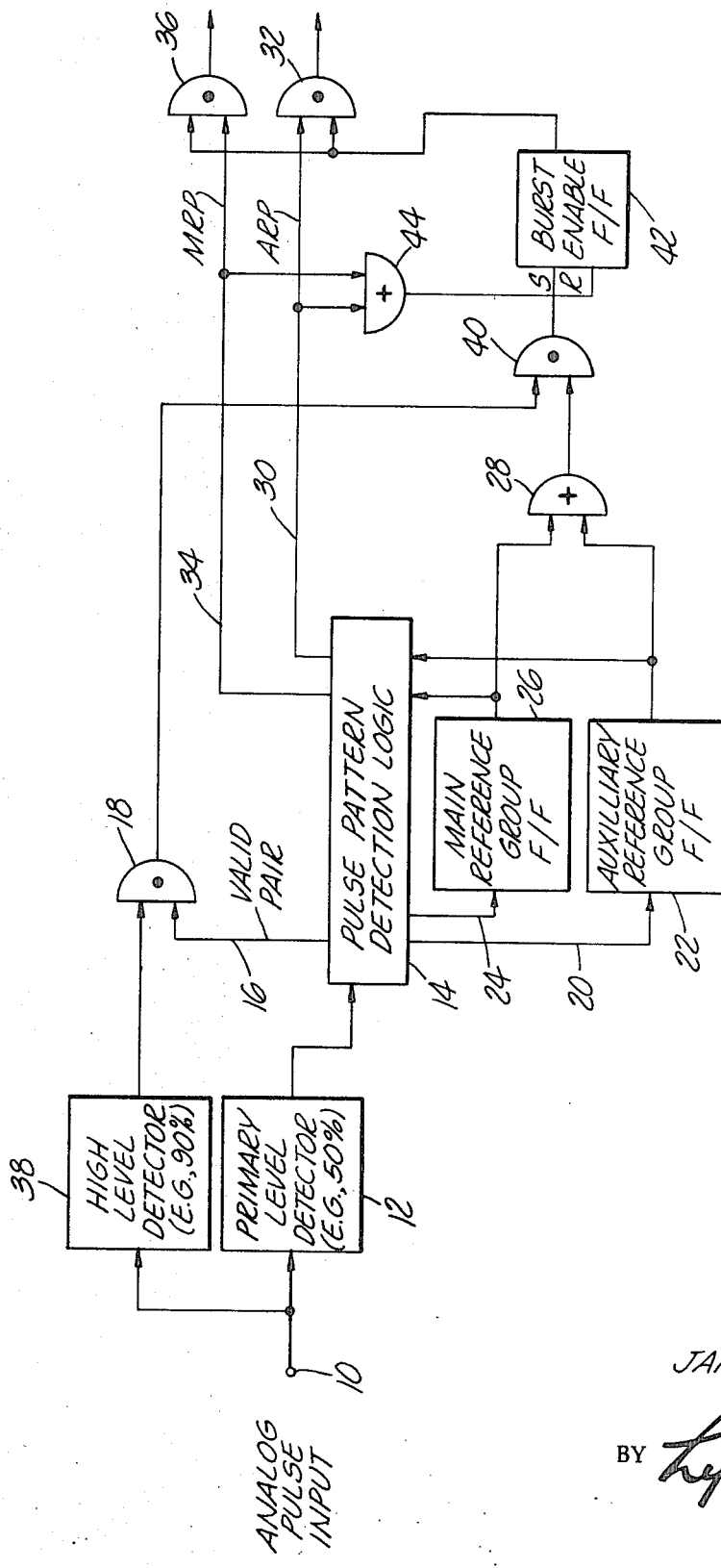
FIG. 2 is a block diagram of the system of the present invention.

FIG. 2 shows circuitry that will substantially eliminate this problem. The input pulses are fed from the input terminal 10 to a primary level detector 12 which passes the pulses only if they exceed some predetermined value, for example. 50% of the maximum pulse height as established in the conventional manner by the automatic gain control circuit of the system. The output of the primary level detector 12 is fed to pulse pattern detection logic 14 which is programmed to determine if the pulses passed by the level detector 12 match either of the patterns built into the logic. These patterns, as in the conventional Tacon equipment, match the main reference burst of a Tacon ground beacon which is transmitted when the ground beacon points due north, and the auxiliary reference bursts transmitted by the ground beacon at every 40° of revolution of the beacon antenna. The main reference burst comprises 12 pulse pairs, the pulses in the pairs being separated by 12 microseconds and then pair themselves being separated by 30 microseconds. The auxiliary reference group is made up of 12 pulses separated by 12 microsecond intervals.

When the pulse pattern detection logic 14 receives a first pulse, a counter is activated to set up suitable gating to determine when the next pulse occurs. If a second pulse occurs 12 microseconds after the first, the logic 14 produces an output on the valid pair line 16 which is fed to an AND gate 18. This valid pair output can be made to last any desired duration but preferably lasts for the expected duration of the reference groups. The logic 14 continues to look at the input pulses and if it receives another pulse 12 microseconds after the second pulse, an output is produced on the line 20 that sets the auxiliary reference group flip-flop 22. If, on the other hand, the third pulse arrives 30 microseconds later, the logic 14 produces an output on the line 24 which sets the main reference group flip-flop 26.

When the auxiliary reference group flip-flop 22 is set, its output is fed to one input of an OR gate 28 and also is fed back into a second section of the logic 14 and serves to inform the logic that an auxiliary reference group is being received. Appropriate gates are then set in the logic 14 and the counter therein continues to see if the rest of the pulses of the auxiliary reference group are present. If they are, the logic 14 produces an output on the auxiliary reference pulse (ARP) line 30 which is connected to one input of an AND gate 32.

The output of the main reference group flip-flop 26 is also connected to one input of the OR gate 28 and to the second section of the logic 14. If the flip-flop 26 is set, its output informs the detection logic 14 that it should look for the main reference pulse pattern and sets the appropriate gates for this purpose. If all of the pulses in the group are in the proper position, an output is produced on the main reference pulse (MRP) line 34 which is connected to one input of an AND gate 36.

The input pulses appearing at the input terminal 10 are also fed to a high level detector 38 which produces an output only if one of the pulses exceeds a reference level considerably higher than the level set by the detector 12, for example. 90% of the maximum pulse height. The output of the level detector 38 is connected to the other input of the AND gate 18. The output of the AND gate 18 is connected to one input of an AND gate 40, the other input of which is connected to the output of the OR gate 28. The output of the AND gate 40 is connected to the set input of a burst enable flip-flop 42. The reset input of the burst enable flip-flop 42 is connected to the output of an OR gate 44 which is set to produce an output in response to the trailing edge of a pulse on either of the lines 30 or 34.

The operation of the circuit of FIG. 2 is believed apparent from the foregoing description. When either of the flip-flops 22 or 26 is set, the gate 28 produces an output which is fed to the AND gate 40. If the pulse pattern detection logic 14 produces an output on the line 16 indicating that at least a valid pair of pulses has been received, and if one of the pulses received exceeds the level set in the detector 38, the AND gate 18 produces an output which enables the gate 40 with the result that the burst enable flip-flop 42 is set. The resulting output of the flip-flop 42 sets the AND gates 42 and 36 and permits an output pulse appearing on either of the lines 30 or 34 to be passed to the following system to indicate that an auxiliary or a main reference group of pulses has been received. The trailing edge of the pulse on either of the lines 30 or 34 causes the OR gate 44 to produce a signal which resets the flip-flop 42 and closes the gates 32 and 36. The counter in the logic 14 continues to run and reset the flip-flops 22 and 26 and the circuitry is now ready to receive another group of pulses. As can be seen, no output signal is developed by the gates 32 and 36 unless one of the input pulses exceeded a 90% threshold level. As can be seen from FIG. 1, it is extremely unlikely that any of the pulses from the weaker beacon could exceed this threshold and thus better co-channel rejection and increased accuracy and reliability are achieved.

Figure 3:
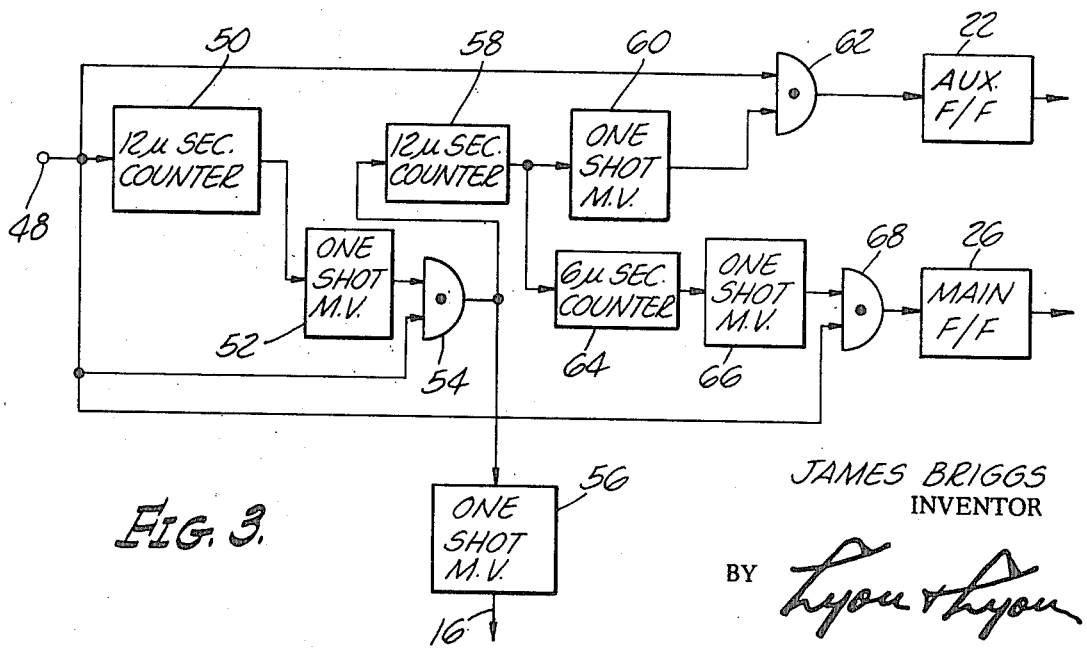
FIG. 3 is a block diagram of logic circuitry that can be used in the system of FIG. 2.

While it is believed that the circuit necessary for the operation of the pulse pattern detection logic 14 would be obvious to one skilled in the art, FIG. 3 illustrates a typical manner in which the logic 14 could be constructed. The pulses received from the level detector 12 are applied to the input terminal 48 which is connected to the input of a twelve microsecond counter 50, the output of which is connected to a one-shot multivibrator 52. The output of the multivibrator 52 is connected to one input of an AND gate 54, the other input of which is connected to the terminal 48. The output of the AND gate 54 is connected to a one-shot multivibrator 56 the output of which appears on the line 16. The output of AND gate 54 is also connected to the input of another twelve microsecond counter 58. The output of the twelve microsecond counter 58 is connected to the input of a one-shot multivibrator 60 whose output is connected to one input of an AND gate 62, the other input of which is connected to the input terminal 48.

The output of the counter 58 is also connected to the input of a six microsecond counter 64, the output of which is connected to a one-shot multivibrator 66. The output of the multivibrator 66 is connected to one input of an AND gate 68, the other input of which is connected to the input terminal 48. The output of the AND gate 62 is connected to the auxiliary reference group flip-flop 22 while the output of the AND gate 68 is connected to the main reference group flip-flop 26.

The first pulse that is received at the terminal 48 causes the counter 50 to begin to count. Twelve microseconds later, the counter 50 produces an output which energizes the one-shot multivibrator 52, and energizes one input of the AND gate 54. If another pulse occurs on the terminal 48 at this time, that is, twelve microseconds after the first pulse, the gate 54 produces an output which triggers the one shot 56. The one shot can be selected to have any desired output duration, but preferably is energized for the expected duration of the reference groups. If even greater accuracy is desired, the output of the one shot 56 can be chosen so that only selected pulses in the group are available to satisfy the additional threshold requirement. The output of the gate 54 also starts the counter 58 counting with the result that twelve microseconds later the one-shot multivibrator 60 is triggered to energize an input of the gate 62. If a third pulse occurs at the input terminal 48 at this time, twelve microseconds after the second pulse, the gate 62 produces an output which energizes the auxiliary flip-flop 22.

The output of the counter 58 also energizes the six microsecond counter 64 with the result that six microseconds later, the one-shot multivibrator 66 is energized and actuates the gate 68. If the third input pulse appears at the terminal 48 at this time, that is, thirty microseconds after the first input pulse, the gate 68 produces an output that energizes the main reference group flip-flop 26. It will be obvious that this logic circuitry can be continued with separate counters after both the main and auxiliary flip-flops which counters would operate together with additional one-shot multivibrators and additional gates to determine if the subsequent pulses of the respective reference groups appear at the proper time.

From the foregoing description, it can be seen that a system has been provided that insures much superior co-channel rejection than has heretofore been possible. This is accomplished by requiring that the input pulses pass one test additional to those normally required, namely, that at least one pulse in the group exceed a threshold value higher than the threshold set for pulse group reception as a whole.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A system for producing an output signal upon the occurrence of a pulse train of predetermined pattern and magnitude comprising:
   first level detector means for passing pulses in said pulse train which exceed a first predetermined level;
   first output producing means coupled to said first level detector means for producing an output if said pulses passed by said first level detector means follow said predetermined pattern;
   second level detector means for producing a second output in response to a pulse in said pulse train exceeding a second predetermined level, said second level being higher than said first level; and
   means coupled to said first output producing means and said second level detector means producing an output signal in response to outputs therefrom.

2. A system for producing an output signal upon the occurrence of a pulse train of predetermined pattern and magnitude comprising:
   first level detector means for passing pulses in said pulse train which exceed a first predetermined level;

means coupled to the output of said first level detector means for determining if at least a portion of said pulse train follows said predetermined pattern and producing an output indicative thereof;

means for producing an output signal if the entirety of said pulse train follows said predetermined pattern;

second level detector means for producing an output in response to a pulse in said pulse train exceeding a second predetermined level, said second level being higher than said first level;

first gate means coupled to said second level detector means and said portion determining means for producing an output in response to outputs from both of said means; and output means coupled to said first gate means and said entirety determining means for producing said output signal in response to outputs from both of said means.

3. A system for producing an output signal upon the occurrence of a pulse train of predetermined pattern and magnitude comprising:

an input for receiving said pulse train;

first level detector means coupled to said input for passing pulses in said pulse train which exceed a first predetermined level;

first logic means ocupled to the output of said first level detector means for determining if at least a portion of said pulse train follows said predetermined pattern and producing an output indicative thereof;

means coupled to said first logic means for producing a pulse in response to an output therefrom;

second logic means coupled to said pulse producing means and activated thereby for producing an output of the entirety of said pulse train follows said predetermined pattern;

second level detector means coupled to said input for producing an output in response to a pulse in said pulse train exceeding a second predetermined level, said second level being higher than said first level;

first gate means coupled to said second level detector means and said first logic means for producing an output in response to coinciding outputs from both of said means;

second gate means coupled to said first gate means and said pulse producing means for producing an output in response to coinciding output from both of said means; and output means coupled to said second gate means and said second logic means for producing said output signal in response to outputs from both of said means.

4. The system of claim 3 wherein said output means comprises a flip-flop for producing an output in response to an output from said second gate means and a third gate means coupled to said flip-flop and said second logic means.

5. The system of claim 3 wherein said pulse producing means comprises a flip-flop.

6. The system of claim 4 wherein said flip-flop is de-energized by the trailing edge of the output of said second logic means.

7. A system for producing a first or second output signal upon the occurrence of a pulse train of predetermined magnitude and of either of two predetermined patterns comprising:

an input for receiving said pulse train;

first level detector means coupled to said input for passing pulses in said pulse train which exceed a first predetermined level;

first logic means coupled to the output of said first level detector means for producing a first output if a portion of said pulse train follows a portion of both of said patterns, a second output indicative that said pulse train is following a first of said patterns and a third output indicative that said pulse train is following the second of said patterns;

a first flip-flop coupled to said first logic means for producing an output in response to said second output thereof;

a second flip-flop coupled to said first logic means for producing an output in response to said third output thereof;

first gate means coupled to said first and second flip-flops for producing an output in response to an output from either of them;

second logic means coupled to said first and second flip-flops and responsive to an output from said first flip-flop to produce a first output if the entirety of said pulse train follows said first pattern and responsive to an output from said second flip-flop to produce a second output if the entirety of said pulse train follows said second pattern;

second level detector means coupled to said input for producing an output in response to a pulse in said pulse train exceeding a second predetermined level, said second level being higher than said first level;

a first AND gate coupled to said second level detecting means and said first logic means for producing an output in response to a coincidence of said output of said second level detector means and said first output of said first logic means;

a second AND gate coupled to said first AND gate and said first gate means for producing an output in response to a coincidence of the outputs therefrom;

a third flip-flop coupled to said second AND gate and responsive to an output therefrom for producing an output;

a third AND gate coupled to said third flip-flop and to said second logic means for producing said first output signal in response to a coincidence of the outputs therefrom; and a fourth AND gate coupled to said third flip-flop and to said second logic means for producing said second output signal in response to a coincidence of the outputs therefrom.

8. The system of claim 7 wherein an OR gate is provided to reset said third flip-flop in response to the trailing edge of said first or second outputs of said second logic means.

9. The system of claim 7 wherein means are provided to condition said first AND gate to pass said output of said second level detector means for a predetermined duration.

10. The system of claim 9 wherein said duration is approximately equal to the duration of the longest of said first and second patterns.

11. The system of claim 7 wherein said first predetermined level is approximately 50% of the maximum pulse height in said system and said second predetermined level is approximately 90% of said maximum pulse height.

References Cited

UNITED STATES PATENTS 3,095,541  6/1963  Ashcraft _____ 307—235
3,437,834  4/1969  Schwartz _____ 328—150

JOHN S. HEYMAN, Primary Examiner

D. M. CARTER, Assistant Examiner

U.S. Cl. X.R.
328—110; 343—106